(12) United States Patent
Ezra et al.

(10) Patent No.: US 9,244,778 B2
(45) Date of Patent: Jan. 26, 2016

(54) MANAGING PHYSICAL RESOURCES OF A STORAGE SYSTEM

(71) Applicant: INFINIDAT LTD., Herzliya (IL)

(72) Inventors: Josef Ezra, Even Yehuda (IL); Ido Ben Tsion, Ness-Ziona (IL); Yechiel Yochai, Moshav Aviel (IL); Efraim Zeidner, Haifa (IL)

(73) Assignee: INFINIDAT LTD., Herzliya (IL)

( * ) Notice: Subject to any disclaimer, the term of this patent is extended or adjusted under 35 U.S.C. 154(b) by 235 days.

(21) Appl. No.: 14/147,630

(22) Filed: Jan. 6, 2014

(65) Prior Publication Data

US 2015/0193314 A1    Jul. 9, 2015

(51) Int. Cl.
| | |
|---|---|
| G06F 12/00 | (2006.01) |
| G06F 11/14 | (2006.01) |
| G06F 3/06 | (2006.01) |
| G06F 12/06 | (2006.01) |
| G06F 12/10 | (2006.01) |
| G06F 12/02 | (2006.01) |

(52) U.S. Cl.
CPC .......... *G06F 11/1466* (2013.01); *G06F 3/0604* (2013.01); *G06F 3/065* (2013.01); *G06F 3/0638* (2013.01); *G06F 3/0646* (2013.01); *G06F 3/0652* (2013.01); *G06F 3/0683* (2013.01); *G06F 11/1448* (2013.01); *G06F 12/0292* (2013.01); *G06F 12/06* (2013.01); *G06F 12/10* (2013.01); *G06F 2003/0697* (2013.01); *G06F 2201/84* (2013.01)

(58) Field of Classification Search
CPC ............ G06F 11/1446; G06F 11/1448; G06F 2201/84; G06F 12/0292; G06F 12/06; G06F 12/10; G06F 3/0646; G06F 3/0652
See application file for complete search history.

(56) References Cited

U.S. PATENT DOCUMENTS

2010/0037031 A1*  2/2010  DeSantis ............. G06F 11/1464
                                                                 711/162

* cited by examiner

*Primary Examiner* — Shawn X Gu
(74) *Attorney, Agent, or Firm* — Reches Patents

(57) ABSTRACT

A method for managing physical resources of a storage system, the method may include transmitting, to a remote site, first information representative of a first snapshot of a logical entity; wherein the first snapshot is associated with first data that is stored in first physical addresses of the storage system; wherein the first physical addresses are mapped to first logical addresses; receiving from the remote site a first acknowledgment indicating that the first information was fully received by the remote site; and disassociating, in response to a reception of the first acknowledgement, the first snapshot from the first physical addresses while maintaining a logical association between the first snapshot and the first logical addresses.

17 Claims, 19 Drawing Sheets

Updating snapshot family metadata to reflect the disassociating of the first physical storage addresses while maintaining the logical association between the first snapshot and the first logical addresses. The snapshot family metadata may be indicative of members of a snapshot family and relationships between members of the snapshot family. The snapshot family may include the logical entity and snapshots of the logical entity. 421

Tagging the first snapshot as being a disassociated snapshot. 422

Updating a logical to physical mapping data structure to reflect the disassociating of the first physical storage addresses while maintaining the logical association between the first snapshot and the first logical addresses. The logical to physical mapping data structure is allocated to a snapshot family and is indicative of a mapping between logical addresses and physical addresses. The snapshot family includes the logical entity and snapshots of the logical entity. 423

Updating a non-compressed MVL or a compressed MVL to indicate that a snapshot is a disassociated snapshot. 424

Updating a mapping data structure that does not provide a distinction between cached and destaged data. 425

Updating a cache memory data structure to reflect the disassociating of the first physical storage addresses while maintaining the logical association between the first snapshot and the first logical addresses. 426

Updating a cache memory metadata and a permanent storage metadata to reflect the disassociating of the first physical storage addresses while maintaining the logical association between the first snapshot and the first logical addresses. 427

| Snap-ID | C0 |
|---|---|
| Physical address | PA1 |
| Data stored | DD1 |
| snap version | 0 |

Mapping
metadata 200

| Snap-ID | C0 | S1 | S2 |
|---|---|---|---|
| Physical address | PA1 | - | PA1 |
| Data stored | DD1 | - | DD1 |
| snap version | 0 | 0 | 0 | mapping metadata 200

| Snap-ID | C0 | S1 | S2 |
|---|---|---|---|
| Physical address | PA2 | - | PA1 |
| Data stored | DD2 | - | DD1 |
| snap version | 2 | 0 | 0 | mapping metadata 200

S-TREE 210

| Snap-ID | C0 | S1 | S2 |
|---|---|---|---|
| Physical address | PA3 | - | - |
| Data stored | DD3 | - | - |
| snap version | 2 | 0 | 0 | mapping metadata

| Snap-ID | C0 | S2 |
|---|---|---|
| Physical address | PA3 | - |
| Data stored | DD3 | - |
| snap version | 2 | 0 | mapping metadata

| Snap-ID | C0 | S2 | S3 |
|---|---|---|---|
| Physical address | PA3 | - | PA3 |
| Data stored | DD3 | - | DD3 |
| snap version | 2 | 0 | 2 | mapping metadata

| Snap-ID | C0 | S3 | S4 |
|---|---|---|---|
| Physical address | PA4 | - | PA4 |
| Data stored | DD4 | - | DD4 |
| snap version | 3 | 0 | 3 | mapping metadata 200

S-TREE

| C0 |
|---|
| S1* |
| C0 |

Clone line
table
230

| Snap-ID | C0 | S1 |
|---|---|---|
| DBA | DBA1 | - | compressed MVE
220

| Snap-ID | C0 | S1 |
|---|---|---|
| DBA | DBA1 | - | non-Compressed MVE 240

| Snap-ID | C0 | S1 |
|---|---|---|
| Physical address | CA1 | - |
| Data stored | DD1 | - |
| snap version | 0 | 0 |

Cache mapping data structure 250

| | Snap-ID | C0 | S1 | |
|---|---|---|---|---|
| C0 | DBA | DBA2 | - | |
| S1* | | compressed MVE | | |
| S2 | | 220 | | |
| C0 | | | | |

Clone line
Table 230

| Snap-ID | C0 | S1 | S2 |
|---|---|---|---|
| DBA | DBA2 | - | DBA2 | non-Compressed MVE 240

| Snap-ID | C0 | S1 | S2 |
|---|---|---|---|
| Physical address | DBA2 | - | DBA2 |
| Data stored | DD2 | - | DD2 |
| snap version | 1 | 0 | 1 | mapping metadata 200

| C0 |
|---|
| S2* |
| S3 |
| C0 |

Clone line table 230

S-TREE 210

| Snap-ID | C0 | S3 |
|---|---|---|
| Physical address | CA3 | CA3 |
| Data stored | DD3 | DD3 |
| snap version | 2 | 2 |

Cache mapping data structure 250

| Snap-ID | C0 |
|---------|------|
| DBA | DBA3 | compressed MVE
220

| C0 |
|-----|
| S3* |
| C0 |

Clone line table
230

| Snap-ID | C0 | S3 |
|---------|------|-----|
| DBA | DBA3 | - | non-Compressed MVE 240

| Snap-ID | C0 | S3 |
|---------|-----|-----|
| Physical address | CA3 | CA3 |
| Data stored | DD3 | DD3 |
| snap version | 2 | 2 |

Cache mapping data structure 250

MANAGING PHYSICAL RESOURCES OF A STORAGE SYSTEM

BACKGROUND

Remote mirroring in storage systems is used to replicate logical volumes of a primary (also called 'local') storage system to a secondary (also called 'remote') storage system. In asynchronous remote mirroring, batches of updates are periodically sent to the remote site. The batches of updates are performed in cycles, wherein in each cycle the local system determines the changes that occurred in the logical volume to be replicated, since the previous cycle and transmits the changes to the remote site.

Snapshots can be taken in the local system upon starting a new cycle and the updates to be transmitted to the remote site in the new cycle are determined by comparing successive snapshots. The local system sequentially transmits all the determined updates to the remote site. Upon completion of the cycle, a snapshot of the mirrored volume may be taken at the remote system to reflect a valid replica of the local volume and can be used for restoring a compatible and consistent state of the mirrored volume, in case of a restart after failure of the remote system.

Snapshots are associated with data that is stored in the storage system while consuming physical resources such as storage space. Upon creation, the snapshot shares the physical space of the source volume (from which the snapshot was taken), until physical blocks of the source volume are written to and cannot longer be shared with the snapshot. When blocks of the source volume are updated, according to one technique, called copy-on-write, the blocks to be updated are copied to a new physical space before being overwritten by new data of the source volume, and the new physical space is now associated only with the snapshot and not shared with the source volume. According to another technique, no copy is performed before the update, but only pointer manipulation is used: the snapshot continues to refer to the old unchanged blocks, while the source volume refers to new address of blocks, where the new data is written. In either case, after the update, the source and the snapshot no longer share a physical copy of the changed blocks. The longer the snapshot exists and the source volume is kept being updated, the more physical space will be consumed by the snapshot alone.

There is a growing need to reduce the allocation of physical resources to snapshots.

SUMMARY

According to an embodiment of the invention various methods may be provided and may be described in the specification. According to various embodiments of the invention there may be provided a non-transitory computer readable medium that may store instructions for performing any of the methods described in the specification and any steps thereof, including any combinations of same. Additional embodiments of the invention include a storage system arranged to execute any or all of the methods described in the specification above, including any stages-and any combinations of same.

According to an embodiment of the invention there may be provided a method for managing physical resources of a storage system, the method may include transmitting, to a remote site, first information representative of a first snapshot of a logical entity; wherein the first snapshot may be associated with first data that may be stored in first physical addresses of the storage system; wherein the first physical addresses may be mapped to first logical addresses; receiving from the remote site a first acknowledgment indicating that the first information was fully received by the remote site; and disassociating, in response to a reception of the first acknowledgement, the first snapshot from the first physical addresses while maintaining a logical association between the first snapshot and the first logical addresses.

The method may include performing a physical resource management operation that may be responsive to the physical disassociation of the first physical addresses.

The method may include transmitting to the remote site second information representative of a second snapshot of the logical entity; wherein the second snapshot may be associated with second data that may be stored in second physical addresses of the storage system; wherein the second physical addresses may be mapped to second logical addresses;

receiving from the remote site a second acknowledgment indicating that the second information was fully received by the remote site; disassociating, in response to a reception of the second acknowledgement, the second snapshot from the second physical addresses while maintaining a logical association between the second snapshot and the second logical addresses; and terminating, in response to the reception of the second acknowledgement, the logical association between the first snapshot and the first logical addresses.

The method may include deleting, in response to the reception of the second acknowledgement, information about the first snapshot.

The method may include calculating the second information representative of the second snapshot in response to at least the logical association between the first snapshot and the first logical addresses.

The calculation of the second information representative of the second snapshot may occur after the disassociating of the first snapshot from the first physical addresses.

The method may include updating snapshot family metadata to reflect the disassociating of the first physical addresses while maintaining the logical association between the first snapshot and the first logical addresses; wherein the snapshot family metadata may be indicative of members of a snapshot family and relationships between members of the snapshot family; and wherein the snapshot family may include the logical entity and snapshots of the logical entity.

The updating of the snapshot family metadata may include tagging the first snapshot as being a disassociated snapshot.

The method may include updating a logical to physical mapping data structure to reflect the disassociating of the first physical addresses while maintaining the logical association between the first snapshot and the first logical addresses; wherein the logical to physical mapping data structure may be allocated to a snapshot family and may be indicative of a mapping between logical addresses and physical addresses; wherein the snapshot family may include the logical entity and snapshots of the logical entity.

The logical to physical mapping data structure may include multiple portions; wherein each portion of the logical to physical mapping data structure may be dedicated to a logical address range; wherein each portion of the logical to physical mapping data structure may include physical addresses mapped to the logical address range; wherein the physical addresses may be indicative of physical address ranges allocated to data associated with one or more snapshot family members.

The updating may include deleting from the logical to physical mapping data structure any association between the first snapshot and any of the first physical addresses while maintaining indications of the logical association between the first snapshot and the first logical addresses.

The logical to physical mapping data structure may explicitly associate up to a single snapshot family member per physical address range; wherein when the single snapshot family member and at least one additional snapshot family members may be associated with a same physical address range then an association between the at least one additional snapshot family member and the physical address range may be expressed by snapshot family metadata that may be indicative of members of a snapshot family and relationships between members of the snapshot family; and wherein the method may include updating one of more out of (a) the logical to physical mapping data structure and (b) the snapshot family metadata to reflect the disassociating of the first physical addresses while maintaining the logical association between the first snapshot and the first logical addresses.

The at least one first physical address of the first physical addresses may be associated with a cache memory space and wherein the method may include updating a cache memory data structure to reflect the disassociating of the first physical storage addresses while maintaining the logical association between the first snapshot and the first logical addresses.

The at least one first physical address of the first physical addresses may be associated with a cache memory space and wherein at least one other first physical address of the first physical addresses may be associated with a permanent storage space; wherein the method may include updating a cache memory metadata and a permanent storage metadata to reflect the disassociating of the first physical storage addresses while maintaining the logical association between the first snapshot and the first logical addresses.

The method may include receiving a request to generate a requested snapshot; determining whether the request to generate the requested snapshot may be included in a mirroring process during which snapshots may be mirrored to the remote site; when it may be determined that the request to generate the requested snapshot may be not included in the mirroring process then preventing a disassociation of the requested snapshot from physical addresses that store data associated with the requested snapshot while maintaining a logical association between the certain snapshot and the certain logical addresses.

The method may include preventing the disassociation of the requested snapshot when the request to generate the requested snapshot may be originated from a user of the storage system.

The method may include calculating second information representative of a second snapshot that follows the first snapshot, wherein the calculating of the second information may be responsive to at least the logical association between the first snapshot and the first logical addresses.

According to an embodiment of the invention there may be provided a non-transitory computer readable medium that stores instructions that once executed by a computer cause the computer to execute the stages of: transmitting, to a remote site, first information representative of a first snapshot of a logical entity; wherein the first snapshot is associated with first data that is stored in first physical addresses of the storage system; wherein the first physical addresses are mapped to first logical addresses; receiving from the remote site a first acknowledgment indicating that the first information was fully received by the remote site; and disassociating, in response to a reception of the first acknowledgement, the first snapshot from the first physical addresses while maintaining a logical association between the first snapshot and the first logical addresses.

The non-transitory computer readable medium may stores instructions for performing a physical resource management operation that may be responsive to the physical disassociation of the first physical addresses.

The non-transitory computer readable medium may stores instructions for transmitting to the remote site second information representative of a second snapshot of the logical entity; wherein the second snapshot may be associated with second data that may be stored in second physical addresses of the storage system; wherein the second physical addresses may be mapped to second logical addresses;
receiving from the remote site a second acknowledgment indicating that the second information was fully received by the remote site; disassociating, in response to a reception of the second acknowledgement, the second snapshot from the second physical addresses while maintaining a logical association between the second snapshot and the second logical addresses; and terminating, in response to the reception of the second acknowledgement, the logical association between the first snapshot and the first logical addresses.

The non-transitory computer readable medium may stores instructions for deleting, in response to the reception of the second acknowledgement, information about the first snapshot.

The non-transitory computer readable medium may stores instructions for calculating the second information representative of the second snapshot in response to at least the logical association between the first snapshot and the first logical addresses.

The calculation of the second information representative of the second snapshot may occur after the disassociating of the first snapshot from the first physical addresses.

The non-transitory computer readable medium may stores instructions for updating snapshot family metadata to reflect the disassociating of the first physical addresses while maintaining the logical association between the first snapshot and the first logical addresses; wherein the snapshot family metadata may be indicative of members of a snapshot family and relationships between members of the snapshot family; and wherein the snapshot family may include the logical entity and snapshots of the logical entity.

The updating of the snapshot family metadata may include tagging the first snapshot as being a disassociated snapshot.

The non-transitory computer readable medium may stores instructions for updating a logical to physical mapping data structure to reflect the disassociating of the first physical addresses while maintaining the logical association between the first snapshot and the first logical addresses; wherein the logical to physical mapping data structure may be allocated to a snapshot family and may be indicative of a mapping between logical addresses and physical addresses; wherein the snapshot family may include the logical entity and snapshots of the logical entity.

The logical to physical mapping data structure may include multiple portions; wherein each portion of the logical to physical mapping data structure may be dedicated to a logical address range; wherein each portion of the logical to physical mapping data structure may include physical addresses mapped to the logical address range; wherein the physical addresses may be indicative of physical address ranges allocated to data associated with one or more snapshot family members.

The updating may include deleting from the logical to physical mapping data structure any association between the first snapshot and any of the first physical addresses while maintaining indications of the logical association between the first snapshot and the first logical addresses.

The logical to physical mapping data structure may explicitly associate up to a single snapshot family member per physical address range; wherein when the single snapshot family member and at least one additional snapshot family members may be associated with a same physical address range then an association between the at least one additional snapshot family member and the physical address range may be expressed by snapshot family metadata that may be indicative of members of a snapshot family and relationships between members of the snapshot family; and wherein the non-transitory computer readable medium may stores instructions for updating one of more out of (a) the logical to physical mapping data structure and (b) the snapshot family metadata to reflect the disassociating of the first physical addresses while maintaining the logical association between the first snapshot and the first logical addresses.

The at least one first physical address of the first physical addresses may be associated with a cache memory space and wherein the non-transitory computer readable medium may stores instructions for updating a cache memory data structure to reflect the disassociating of the first physical storage addresses while maintaining the logical association between the first snapshot and the first logical addresses.

The at least one first physical address of the first physical addresses may be associated with a cache memory space and wherein at least one other first physical address of the first physical addresses may be associated with a permanent storage space; wherein the method may include updating a cache memory metadata and a permanent storage metadata to reflect the disassociating of the first physical storage addresses while maintaining the logical association between the first snapshot and the first logical addresses.

The non-transitory computer readable medium may stores instructions for receiving a request to generate a requested snapshot;
determining whether the request to generate the requested snapshot may be included in a mirroring process during which snapshots may be mirrored to the remote site; when it may be determined that the request to generate the requested snapshot may be not included in the mirroring process then preventing a disassociation of the requested snapshot from physical addresses that store data associated with the requested snapshot while maintaining a logical association between the certain snapshot and the certain logical addresses.

The non-transitory computer readable medium may stores instructions for preventing the disassociation of the requested snapshot when the request to generate the requested snapshot may be originated from a user of the storage system.

The non-transitory computer readable medium may stores instructions for calculating second information representative of a second snapshot that follows the first snapshot, wherein the calculating of the second information may be responsive to at least the logical association between the first snapshot and the first logical addresses.

According to an embodiment of the invention there may be provided a storage system that may include a communication module that is arranged to (a) transmit, to a remote site, first information representative of a first snapshot of a logical entity; wherein the first snapshot is associated with first data that is stored in first physical addresses of the storage system; wherein the first physical addresses are mapped to first logical addresses; and (b) receive from the remote site a first acknowledgment indicating that the first information was fully received by the remote site; and a snapshot management module that is arranged to disassociate, in response to a reception of the first acknowledgement, the first snapshot from the first physical addresses while maintaining a logical association between the first snapshot and the first logical addresses.

The storage system may be arranged to perform a physical resource management operation that may be responsive to the physical disassociation of the first physical addresses.

The storage system may be arranged to transmitt to the remote site second information representative of a second snapshot of the logical entity; wherein the second snapshot may be associated with second data that may be stored in second physical addresses of the storage system; wherein the second physical addresses may be mapped to second logical addresses; receive from the remote site a second acknowledgment indicating that the second information was fully received by the remote site; disassociating, in response to a reception of the second acknowledgement, the second snapshot from the second physical addresses while maintain a logical association between the second snapshot and the second logical addresses; and terminating, in response to the reception of the second acknowledgement, the logical association between the first snapshot and the first logical addresses.

The storage system may be arranged to deleting, in response to the reception of the second acknowledgement, information about the first snapshot.

The storage system may be arranged to calculate the second information representative of the second snapshot in response to at least the logical association between the first snapshot and the first logical addresses.

The calculation of the second information representative of the second snapshot may occur after the disassociate of the first snapshot from the first physical addresses.

The storage system may be arranged to update snapshot family metadata to reflect the disassociating of the first physical addresses while maintaining the logical association between the first snapshot and the first logical addresses; wherein the snapshot family metadata may be indicative of members of a snapshot family and relationships between members of the snapshot family; and wherein the snapshot family may include the logical entity and snapshots of the logical entity.

The update of the snapshot family metadata may include tagging the first snapshot as being a disassociated snapshot.

The storage system may be arranged to update a logical to physical mapping data structure to reflect the disassociating of the first physical addresses while maintaining the logical association between the first snapshot and the first logical addresses; wherein the logical to physical mapping data structure may be allocated to a snapshot family and may be indicative of a mapping between logical addresses and physical addresses; wherein the snapshot family may include the logical entity and snapshots of the logical entity.

The logical to physical mapping data structure may include multiple portions; wherein each portion of the logical to physical mapping data structure may be dedicated to a logical address range; wherein each portion of the logical to physical mapping data structure may include physical addresses mapped to the logical address range; wherein the physical addresses may be indicative of physical address ranges allocated to data associated with one or more snapshot family members.

The update may include deleting from the logical to physical mapping data structure any association between the first snapshot and any of the first physical addresses while maintaining indications of the logical association between the first snapshot and the first logical addresses.

The logical to physical mapping data structure may explicitly associate up to a single snapshot family member per physical address range; wherein when the single snapshot family member and at least one additional snapshot family members may be associated with a same physical address range then an association between the at least one additional snapshot family member and the physical address range may be expressed by snapshot family metadata that may be indicative of members of a snapshot family and relationships between members of the snapshot family; and wherein the storage system may be arranged to update one of more out of (a) the logical to physical mapping data structure and (b) the snapshot family metadata to reflect the disassociating of the first physical addresses while maintaining the logical association between the first snapshot and the first logical addresses.

The at least one first physical address of the first physical addresses may be associated with a cache memory space and wherein the storage system may be arranged to update a cache memory data structure to reflect the disassociating of the first physical storage addresses while maintaining the logical association between the first snapshot and the first logical addresses.

The at least one first physical address of the first physical addresses may be associated with a cache memory space and wherein at least one other first physical address of the first physical addresses may be associated with a permanent storage space; wherein the storage may be arranged to update a cache memory metadata and a permanent storage metadata to reflect the disassociating of the first physical storage addresses while maintaining the logical association between the first snapshot and the first logical addresses.

The storage system may be arranged to receive a request to generate a requested snapshot;
determine whether the request to generate the requested snapshot may be included in a mirroring process during which snapshots may be mirrored to the remote site; when it may be determined that the request to generate the requested snapshot may be not included in the mirroring process then prevent a disassociation of the requested snapshot from physical addresses that store data associated with the requested snapshot while maintaining a logical association between the certain snapshot and the certain logical addresses.

The storage system may be arranged to prevent the disassociation of the requested snapshot when the request to generate the requested snapshot may be originated from a user of the storage system.

The storage system may be arranged to calculate second information representative of a second snapshot that follows the first snapshot, wherein the calculating of the second information may be responsive to at least the logical association between the first snapshot and the first logical addresses.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1B illustrates an updating stage of the method of FIG. 1A according to an embodiment of the invention;

Figure 1A:
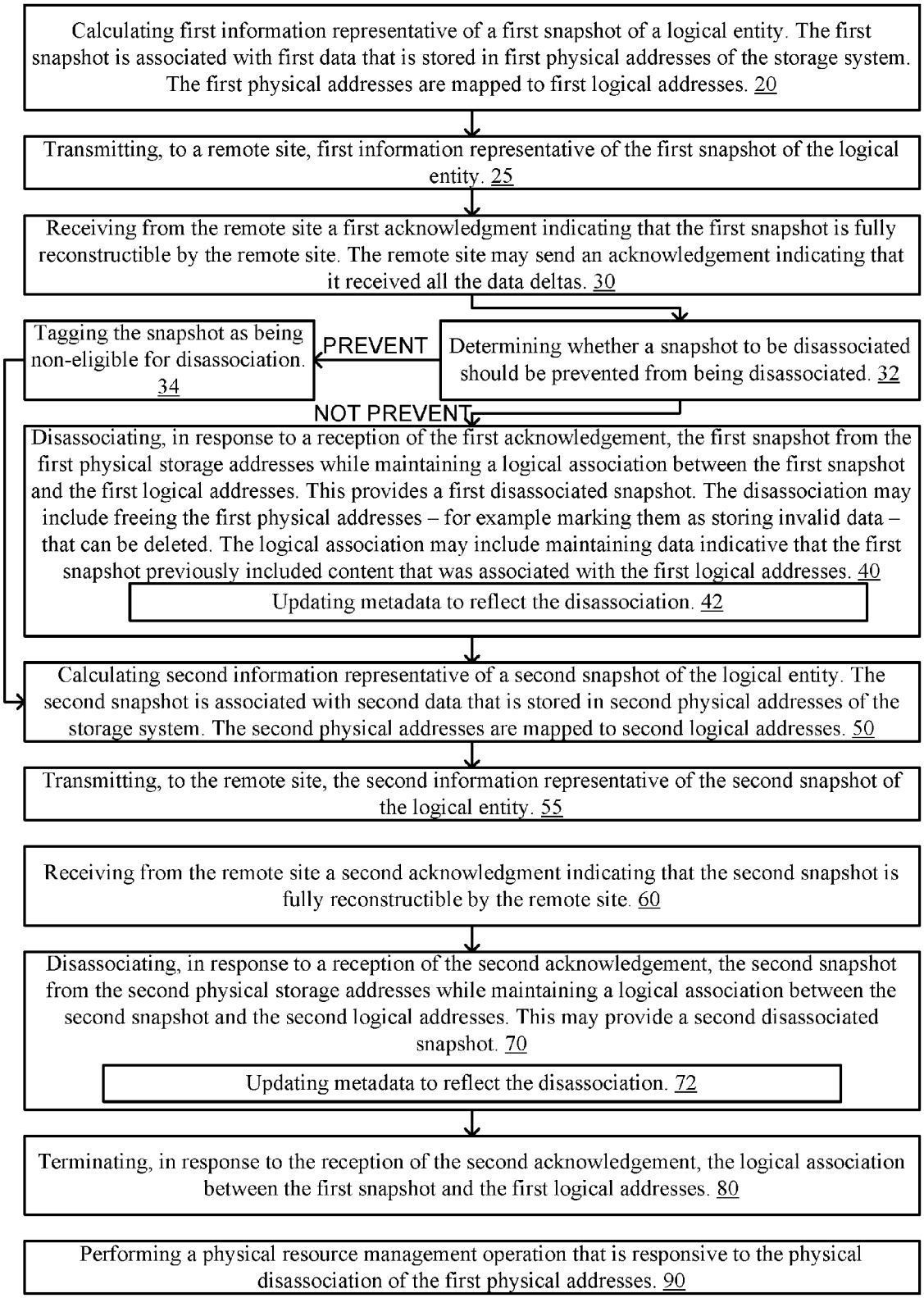
FIG. 1A illustrates a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The terms metadata and data structure are used in an interchangeable manner in the specification.

The terms address and address range are used in an interchangeable manner in the specification. This is especially true when an address is used to represent of an address range (the address may be, for example the first address in the address range).

FIG. 1A illustrates method 10 for managing physical resources of a storage system according to an embodiment of the invention.

Method 10 may start by stage 20 of calculating first information representative of a first snapshot of a logical entity. This first information may be data deltas indicative of differences between (a) a content of the logical entity at a first point in time corresponding to the first snapshot and (b) a content of the logical entity at a previous point in time corresponding to the last snapshot of the logical entity taken before the first snapshot. The differences (data deltas) between the two snapshots can be calculated in order to provide changes in the data that occurred in the logical entity between the two points in time. These data deltas can be sent to a remote storage system, as part of a remote replication (mirroring) process or may be provided to an incremental backup process, or any other process that requires changes that occurred in the logical entity during a certain time period.

The logical entity may be a logical volume, a portion of the logical volume, more than a single logical volume and the like.

The first snapshot may be associated with first data that is stored in first physical addresses of the storage system.

The first physical addresses are mapped to first logical addresses.

Stage 20 may be followed by stage 25 of transmitting, to a remote site, the first information representative of the first snapshot of the logical entity.

Stage 25 may be followed by stage 30 of receiving from the remote site a first acknowledgment indicating that the first information was fully received by the remote site. The remote site may send an acknowledgement indicating that it received all the data deltas.

Stage 30 may be followed by stage 40 of disassociating, in response to a reception of the first acknowledgement, the first snapshot from the first physical storage addresses while maintaining a logical association between the first snapshot and the first logical addresses. This provides a first disassociated snapshot. The disassociation may include freeing the first physical addresses—for example marking them as storing invalid data—that can be deleted. In other cases where the first physical storage addresses are shared with the logical entity or other entities and therefore the first physical storage addresses are still being used by other entities, the disassociation may include decreasing a counter that counts the number of entities using the first physical storage addresses or the disassociation may include any other operation to indicate that the first snapshot is no longer using the first physical storage addresses, without freeing the physical addresses. The logical association may include maintaining data indicative that the first snapshot previously included content that was associated with the first logical addresses.

It is noted that if a read request is received for a data unit that belongs to a snapshot that should be disassociated but is not disassociated yet—then the response to the read request can be delayed until the disassociation is completed. In such a case the update of the disassociation can be executed in real time and with a high priority.

Stage 40 may include stage 42 of updating metadata to reflect the disassociation.

Method 10 may include stage 90 of performing a physical resource management operation. The physical resource management operation may be responsive to the current state of physical resources and may take into account the physical disassociation of the first physical addresses. The physical resource management operation may delete the content of the first physical addresses, mark the physical addresses as free, placing the first physical addresses in a spare pool of physical addresses and the like.

The physical resource management operation can be executed in various manners—for example it may be executed during a background process.

Stage 40 may be followed by stage 50 of calculating second information representative of a second snapshot of the logical entity. The second information may include data deltas between the second and first snapshots. The data deltas may be calculated in view of the first dissociated snapshot—as the logical association between the first snapshot and the first logical addresses indicates which logical addresses were affected by the first snapshot.

The second snapshot is associated with second data that is stored in second physical addresses of the storage system. The second physical addresses are mapped to second logical addresses.

Stage 50 may be followed by stage 55 of transmitting, to the remote site, the second information representative of the second snapshot of the logical entity.

Stage 55 may be followed by stage 60 of receiving from the remote site a second acknowledgment indicating that the second information was fully received by the remote site.

Stage 60 may be followed by stage 70 of disassociating, in response to a reception of the second acknowledgement, the second snapshot from the second physical storage addresses while maintaining a logical association between the second snapshot and the second logical addresses. This may provide a second disassociated snapshot.

Stage 70 may include stage 72 of updating metadata to reflect the disassociation.

Stage 70 may be followed by stage 80 of terminating, in response to the reception of the second acknowledgement, the logical association between the first snapshot and the first logical addresses. This may include deleting any reference to the first snapshot.

Stages 20-80 may be repeated for any number of snapshots. Stages 20-80 may be performed periodically, e.g., as part of a remote mirroring process.

According to an embodiment of the invention the disassociation of a snapshot is applied only to some snapshots but is not applied to other snapshots. For example—snapshots created by a mirroring process may be disassociated and even deleted while snapshots created by other entities (or originated from entities that differ from a mirroring process manager) are not disassociated.

Accordingly, stage 30 may be followed by stage 32 of determining whether a snapshot to be disassociated should be prevented from being disassociated. If so—stage 32 is followed by stage 34 of tagging the snapshot as being non-eligible for disassociation and jumping to stage 50. Such a tagging prevents the termination of that snapshot metadata in stage 80.

The method can be applied in different storage systems that manage their resources in various manners. A storage system may include a cache memory and a permanent storage layer. Information is first written to the cache memory and then it may be destaged to the permanent storage layer. Data units can be read from the cache memory or from the permanent storage layer. Physical resources that are allocated for storing information may reside in the cache memory and in the permanent storage layer.

Various data structures can be used by a storage system to manage its logical and physical resources.

The creation of snapshots, logical associations between snapshots and logical addresses, disassociation of snapshots from their logical addresses, association of snapshots to physical addresses, disassociation of snapshots from physical addresses may be reflected by updating metadata. The metadata can be, explicitly or implicitly, represented by various data structures. Stage 42 and 72 reflect this update.

There are provided various examples of metadata updates. Various data structures are discussed below. Some or all of these data structures may be maintained by a storage system. These data structures are allocated per a snapshot family that includes a master volume and snapshots that were taken from the master volume or any other member of the family.

These data structures include a snapshot tree, a mapping data structure, a non-compressed multiple value entry (MVE) data structure, a clone line table, a compressed MVE, a trie, and a cache mapping data structure. Non-limiting examples illustrating these data structures are provided in FIGS. 2A, 2B, 2C, 2D, 2E, 2F, 2G, 2H, 21, 2J, 2K, 3A, 3B, 3C, 3D, 3E, 3F, 3G, 3H, 3I, 4A and 4B.

Mapping data structure (denoted 200 in FIGS. 2A-2K) provides a mapping between logical addresses and physical addresses (denoted PA). This mapping data structure does not make a distinction between data stored in the cache memory and data stored in the permanent storage layer.

Snapshot Tree (S-Tree).

A snapshot tree (S-tree) represents the relationships between members of the snapshot family, i.e., a master logical entity and its snapshots. The S-tree may provide information about the order (timing) of creation of different snapshots and for each snapshot—what was its origin and the type of the snapshot (for example—read only snapshot or writable snapshot). The S-tree may also indicate if a snapshot is a disassociated snapshot or not.

An inheritance cluster may be defined and may include a writeable member and its direct descendants (generally, read-only snapshots).

Clone Line Table

A clone lines table can be used for facilitating identifying an inheritance cluster. Columns of the table are referred to as clone lines, one clone line for each writeable family member, also called 'clone' (if the snapshot family supports only non-writable snapshots, then only one clone line exists in clone lines table for C0 the master volume). A clone line of a given writeable family member (referred to hereinafter also as a parent clone) is a list of direct descendants of the given parent clone, ordered by respective creation time of the direct descendants.

Trie

The storage system may maintain a mapping between (a) first virtual layer operable to represent the logical address space of each logical volume or snapshot family, the first virtual layer characterized by a plurality of virtual unit addresses (VUA), and (b) a second virtual layer operable to represent the physical storage space, the second virtual layer characterized by a plurality of virtual disk addresses (VDA). For simplicity of explanation the mapping between these virtual layers is referred to as logical to physical mapping. Addresses of the first virtual layer are referred to as logical addresses while addressed of the second virtual layer are referred to as physical addresses.

The trie represents this mapping.

The root of the trie represent the entire logical address space having a size denoted Size0. Each k'th level nodes of the trie represents a logical space that has a size (Sizek) that is a fraction of 2 by power of k of Size0 (Sizek=Size0/$2^k$). The path for reaching each of these k'th level nodes within the trie indicates an offset (in units of a predefined size, e.g., 64 KB) within the entire logical address space. Empty leaves of the trie are indicative of non-allocated physical spaces. Full leaves of the trie are indicative of an allocation of one or more contiguous physical addresses to a contiguous range of logical addresses. Higher leaves are indicative of larger contiguous logical addresses. A path followed from the root to the leaf can indicate an offset of the range of addresses within the given logical volume, represented by the leaf. Full leaves may include compressed or non-compressed MVEs.

The physical addresses can be further mapped to permanent storage space addresses (that may point to specific entries of specific disks), but this is not necessarily so.

Figure 4A:
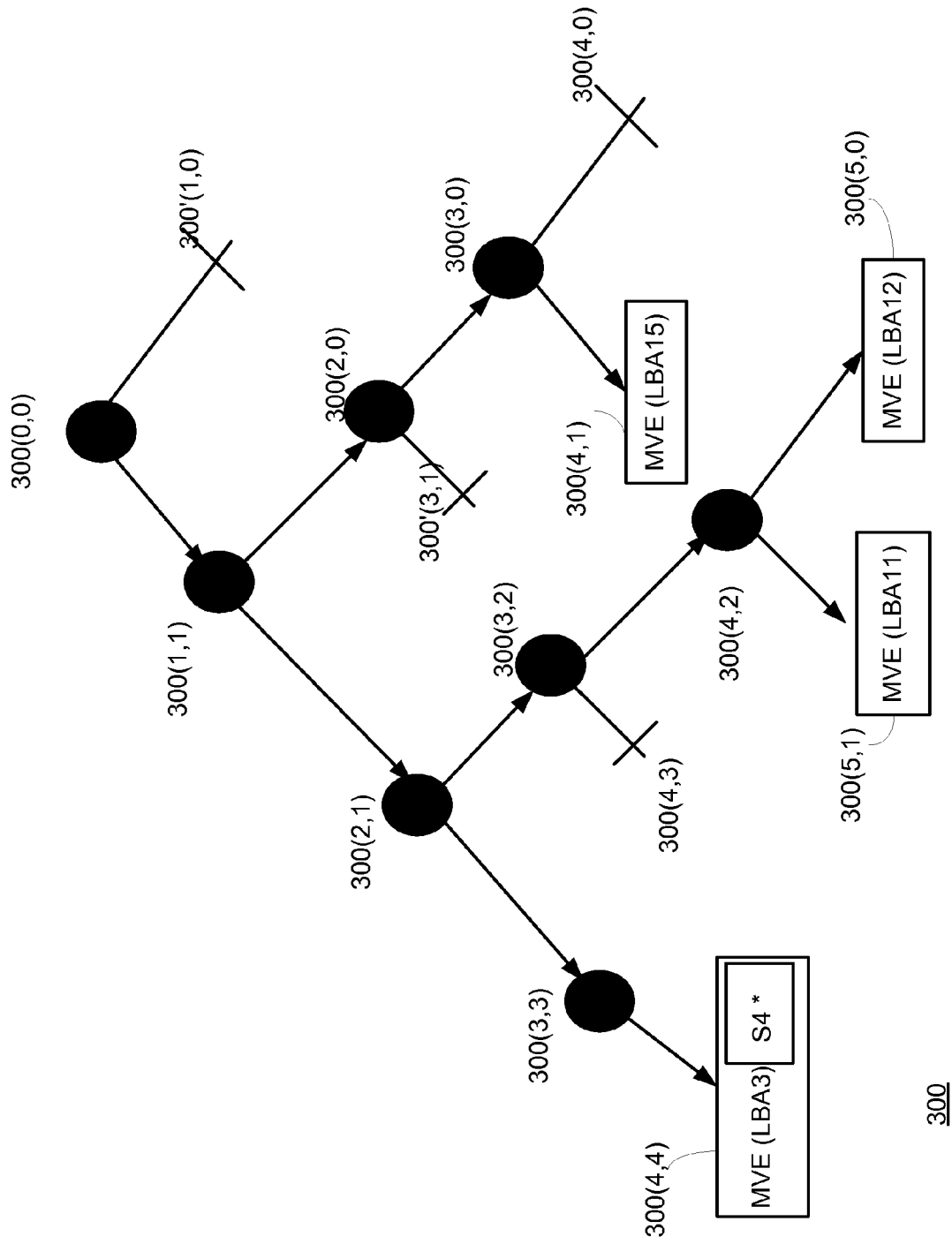
FIGS. 4A-4B illustrate tries according to various embodiments of the invention.
Figure 4B:
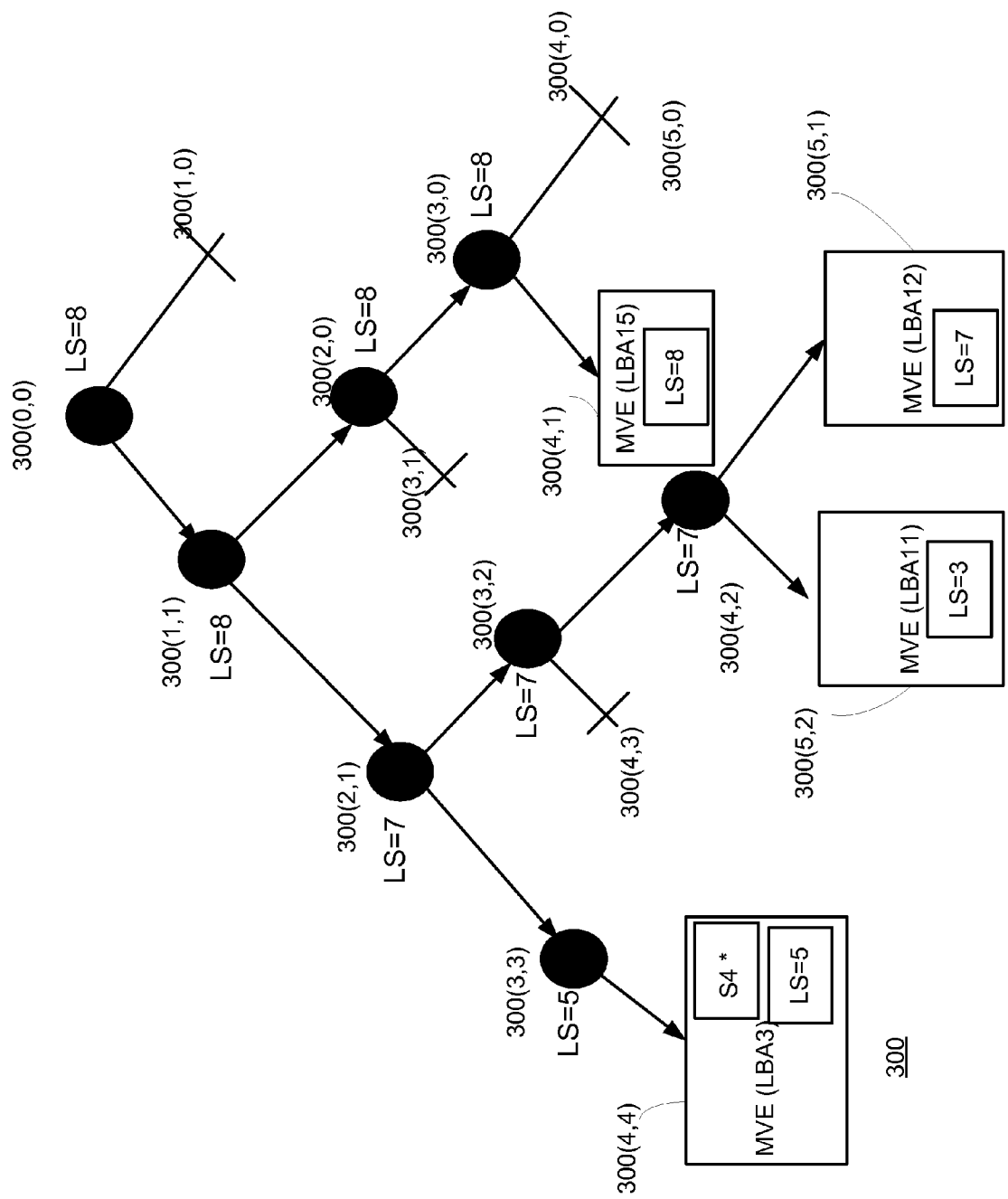

FIGS. 4A and 4B illustrate a trie 300 according to various embodiments of the invention.

Trie 300 includes root 300(0,0), two first level nodes 300(1,0) and 300(1,1), two second level nodes 300(2,0) and 300(2,1), four third level nodes 300(3,0), 300(3,1), 300(3,2) and 300(3,3), five fourth level nodes 300(4,0), 300(4,1), 300(4,2), 300(4,3) and 300(4,4), and two fifth level nodes 300(5,0) and 300(5,1).

Leaves 300(1,0), 300(3,1), 300(4,9), 300(4,3) are empty—indicating that physical address ranges were not allocated to any member of the snapshot family. Leaves 300(4,1), 300(4,3), 300(5,0) and 300(5,1) are not empty and include mapping between logical and physical addresses—such as having compressed or non-compressed MVE. The MVEs of leaves 300(4,1), 300(4,3), 300(5,0) and 300(5,1) are associated with logical address ranges that are identified by logical block addresses LBA15, LBA3, LBA12 and LBA11 respectively. Leaf 300(4,3) shows a tagging of a snapshot as a disassociated snapshot S4\*.

FIG. 4B shows each node of the trie as including an additional field—a last snapshot (LS) field that represents the last snapshot that is associated with the node or any node originating from that node. When data is written to the storage system the last snapshot that existed when the writing occurs is associated with that data.

Accordingly—when a t'th snapshot is created and there is a need to find all data deltas that were written between (a) the creation of the previous snapshot—the (t−1)'th snapshot and (b) the moment of creating the t'th snapshot, all these data deltas can be easily found by traversing the trie and searching for leaves that are associated with LS=(t−1). Stage 20 of method 10 can use the last snapshot field for finding all leaves with LS=(t−1), when calculating information representative of the t'th snapshot. The maintaining of a logical association between the first snapshot and the first logical addresses (or between the second snapshot and the second logical addresses) may include maintaining the last snapshot field.

This search can be expedited by assigning the LS field for nodes above the leaves, such that each intermediate node is assigned with an LS field with a value that represents the maximum value among all LS values of the underneath nodes—so that a node that has a LS field that is associated with LS values that are below (t−1)—and all nodes below that node are irrelevant for the current calculation of the t'th snapshot.

Each one of leaves 300(4,1), 300(4,3), 300(5,2) and 300(5,1) of FIG. 4B includes such fields. For example, these fields indicate that the last snapshot associated with leaf 300(4,1) is the eighth snapshot (LS=8), the last snapshot associated with leaf 300(4,3) is the fifth snapshot (LS=5), the last snapshot associated with leaf 300(5,1) is the seventh snapshot (LS=7) and the last snapshot associated with leaf 300(5,2) is the third snapshot (LS=3).

Node 300(4,2) is the parent of leaves 300(5,2) and 300(5,1) and has a LS field (LS=7) that is the highest out of LS=3 (of leaf 300(5,2)) and LS=7 (of leaf 300(5,1)).

Node 300(3,2) has the same LS field (LS=7) as that of node 300(4,2).

Node 300(3,3) has the same LS field (LS=5) as that of leaf 300(4,3).

Node 300(2,1) is the parent of nodes 300(3,3) and 300(3,2) and has a LS field (LS=7) that is the highest out of LS=5 (of node 300(3,3)) and LS=7 (of node 300(3,2)).

Nodes 300(3,0) and 300(2,0) have the same LS field (LS=8) as that of leaf 300(4,1).

Node 300(1,1) is the parent of nodes 300(2,1) and 300(2,0) and has a LS field (LS=8) that is the highest out of LS=7 (of node 300(2,1)) and LS=8 (of node 300(2,0)).

Root 300(0,0) has the same LS field (LS=8) as that of leaf 300(1,1).

The creation of the ninth snapshot (S9) includes searching for leaves that are associated with LS=8. In this example, there in one leaf with LS=8 and the path to that leaf will include root 300(0,0), nodes 300(1,1), 300(2,0), 300(3,0) and 300(4,1).

Non-Compressed MVE

The Multiple Value Entry (MVE) is utilized for mapping a logical address range associated with the MVE into the various physical address ranges used by various members of the snapshot family. Each MVE can include multiple values representing different physical address ranges assigned to different members of a given snapshot family and associated with the logical address range associated with the MVE.

Compressed MVE

The compressed MVE is a compressed representation of the non-compressed MVE. The compression may be facilitated by using the relationships between snapshots of a snapshot family. Multiple compressions rules may be defined and should be followed during the compression and the reconstruction of information from the compressed MVE. The compression can be applied by using information included in an S-tree and/or in a clone line table. For example—only a single member out of multiple members of an inheritance cluster that shares the same physical address can be represented in the compressed MVE.

Referring to FIG. 1B—stage 42 of FIG. 1A of updating metadata to reflect the disassociation may include stage 421 of updating snapshot family metadata to reflect the disassociating of the first physical storage addresses while maintaining the logical association between the first snapshot and the first logical addresses.

The snapshot family metadata may be indicative of members of the snapshot family and relationships between members of the snapshot family. The snapshot family may include the logical entity and snapshots of the logical entity.

Non-limiting examples of such a snapshot family metadata include S-tree 210 of FIGS. 2C, 2D, 2F, 2G, 2H, 2K, 3F, 3G and clone line table 230 of FIGS. 3A, 3B, 3C, 3D, 3E, 3F, 3G, 3H and 3I.

The updating (421) of the snapshot family metadata may include tagging (422) the first snapshot as being a disassociated snapshot. Non-limiting examples of such tagging are provided by flags 213, 215 and 217 of FIGS. 2D, 2G and 2K respectively, by asterisks in clone line tables 230 of FIGS. 3D, 3E, 3F, 3G, 3H and 3I respectively.

The updating may include updating (423) a logical to physical mapping data structure to reflect the disassociating of the first physical storage addresses while maintaining the logical association between the first snapshot and the first logical addresses. The logical to physical mapping data structure is allocated to a snapshot family and is indicative of a mapping between logical addresses and physical addresses. The snapshot family includes the logical entity and snapshots of the logical entity.

A non-limiting example of a logical to physical mapping data structure is a trie 300 of FIGS. 4A and 4B.

In these figures the leaves of the trie 300 are either empty (leaves 300(1,0), 300(3,1), 300(4,9), 300(4,2) of FIGS. 4A and 4B)—indicating that physical address ranges were not allocated to any member of the snapshot family (or such leaves may not exist if no physical address ranges were assigned to the respective logical address ranges) or include a compressed MVE or a non-compressed MVE (leaves 300(4,1), 300(4,3), 300(5,0) and 300(5,1) of FIGS. 4A and 4B).

FIGS. 4A and 4B illustrate the updating of stage 422 as including tagging snapshot S4 (by asterisks in leaf 300(4,3)) as being a disassociated snapshot.

Stage 42 may include updating (424) the non-compressed MVE or the compressed MVE to indicate that a snapshot is a disassociated snapshot. This may include deleting any association between the first snapshot and any of the first physical addresses while maintaining indications of the logical association between the first snapshot and the first logical addresses. Non-limiting examples of such updates are provided by minus symbols in compressed MVE 220 and in non-compressed MVE 240 of FIGS. 3D, 3E, 3F and 3I respectively.

Stage 42 may include updating (425) mapping metadata. The mapping metadata may be included in one or more mapping data structure. Non-limiting examples of data structures may be provided in FIGS. 2A-2K and 3A-3I.

Non-limiting examples of such updates are provided by minus symbols in mapping data structure 200 of FIGS. 2D, 2E, 2F, 2G, 2H, 2I, 2J and 2K respectively.

Stage 42 may include updating (426) a cache memory data structure to reflect the disassociating of the first physical storage addresses while maintaining the logical association between the first snapshot and the first logical addresses. Non-limiting examples of such updates are provided by minus symbols in cache mapping data structure 250 of FIGS. 3D and 3F respectively.

Stage 42 may include updating (427) a cache memory metadata and a permanent storage metadata to reflect the disassociating of the first physical storage addresses while maintaining the logical association between the first snapshot and the first logical addresses. Non-limiting examples of updating cache mapping data structures are provided by minus symbols in cache mapping data structure 250 of FIGS. 3D and 3F respectively. Non-limiting example of updating permanent storage metadata are provided in any updates of compressed or non-compressed MVE 220 and 240 in FIGS. 3A-3I.

FIGS. 2A-2K illustrate various events and metadata reflecting the events according to various embodiments of the invention. For simplicity of explanation not all of the data structures are shown in each figure. The figures refers to a specific logical address range (related to the data being written), e.g., a specific MVE in the Trie.

The first event (denoted 101 in timing diagram 100 of FIG. 2A) includes the creation of the logical entity C0. The mapping metadata 200 is empty.

The second event (denoted 102 in timing diagram 100 of FIG. 2B) includes writing data DD1 to the logical entity C0. The mapping metadata 200 includes column dedicated to C0—the snap-id field equals C0, the physical address allocated to DD1 is PA1, and the last snapshot existing when event 102 occurred is S0—thus field snap version equals zero. In the various figures there is a field "data stored" (for example data stored DD1 of FIG. 2B) but this field is shown for brevity of explanation—it may not be included in the metadata.

The third event (denoted 103 in timing diagram 100 of FIG. 2C) includes creating a first snapshot S1. Because nothing was written after the writing of DD1 the column dedicated to C0 remains the same and a column dedicated to S1 is a copy of the column dedicated to C0. At this time the s-tree 210 includes root 211 representing C0 and a child 212 representing S1.

The forth event (denoted 104 in timing diagram 100 of FIG. 2D) includes receiving an acknowledgement from the remote site that it (the remote site) successfully received all the information related to S1 and creating a disassociated first snapshot. The creating may include transforming the first snapshot to the first disassociated snapshot.

Because nothing was written after the writing of DD1 the column dedicated to C0 remains the same. Nevertheless—the column dedicated to S1 is changed to reflect the disassociation—fields "physical address" and "data stored" reflect the disassociation by a minus symbol (although any other type of marking can suffice). At this time the s-tree 210 includes root 211 representing C0 and a child 213 representing disassociated S1.

The fifth event (denoted 105 in timing diagram 100 of FIG. 2E) includes creating second snapshot S2. Because nothing was written after the writing of DD1 the column dedicated to C0 remains the same. The column of S1 remains unchanged and a column dedicated to S2 is a copy of the column associated with C0.

The sixth event (denoted 106 in timing diagram 100 of FIG. 2F) includes writing data DD2 to the logical entity C0. The columns dedicated to S1 and S2 remain unchanged. The column dedicated to C0 reflects the writing—because the writing occurred after S2 the snap-id field equals S2, the physical address allocated to DD2 is PA2, the data stored is DD2 and the last snapshot existing when event 106 occurred is S2—thus field snap version equals two. At this time the s-tree 210 includes root 211 representing C0, leaf 213 representing disassociated S1 and leaf 214 representing S2.

Figure 2A:
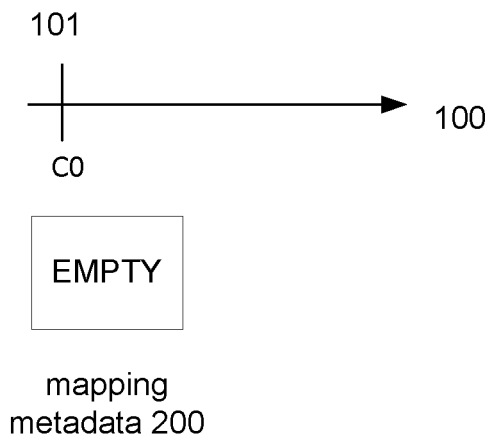
FIGS. 2A-2K illustrate various events and metadata reflecting the events according to various embodiments of the invention.
Figure 2B:
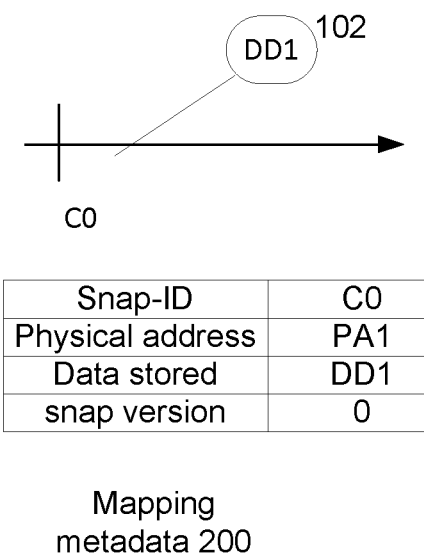
Figure 2C:
Figure 2C:
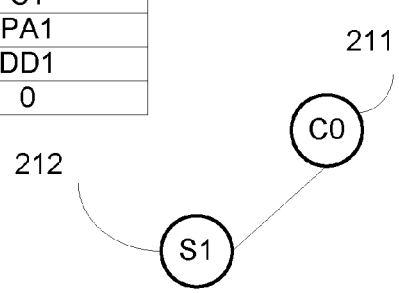
Figure 2D:
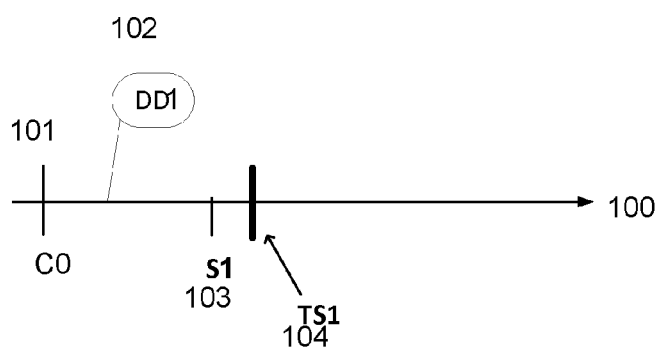
Figure 2D:
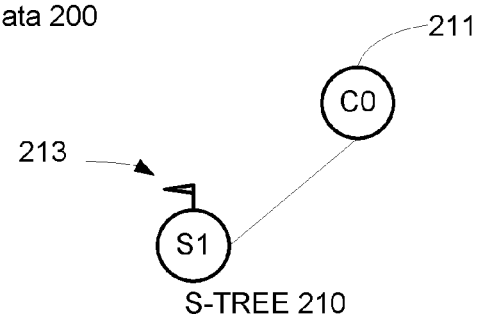
Figure 2E:
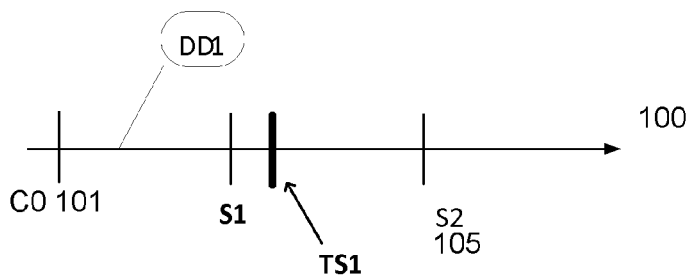
Figure 2F:
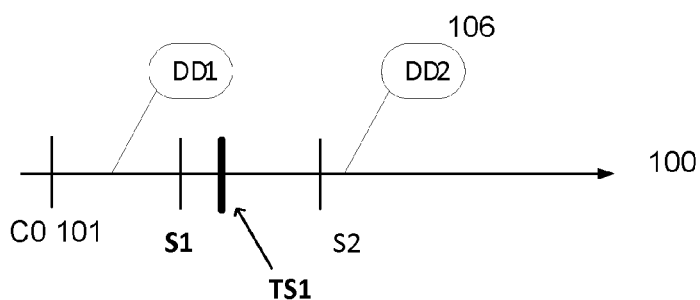
Figure 2F:
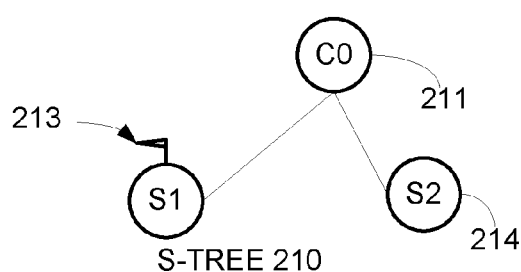
Figure 2G:
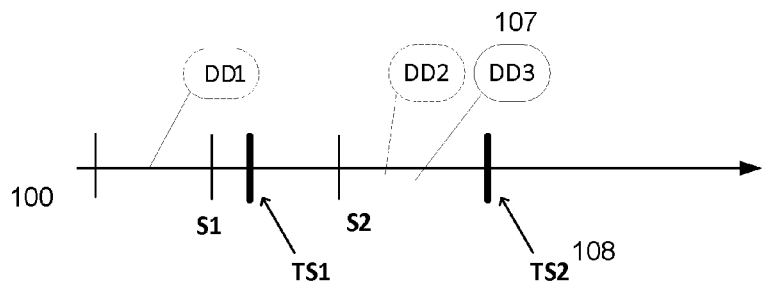
Figure 2G:
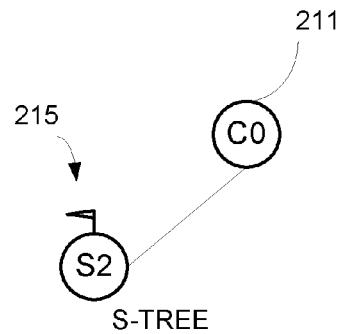
Figure 2H:
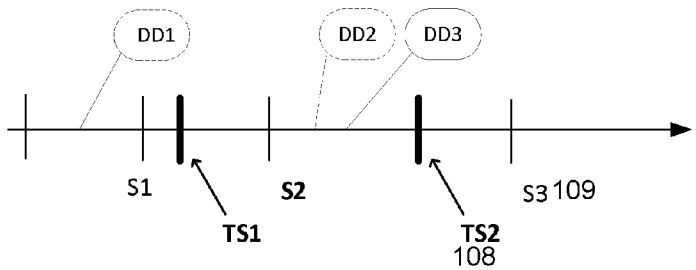
Figure 2H:
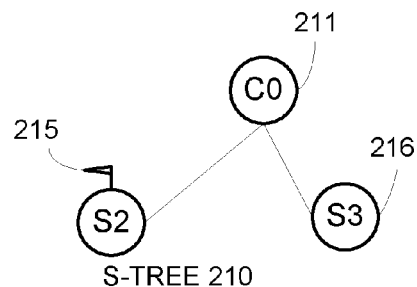
Figure 2I:
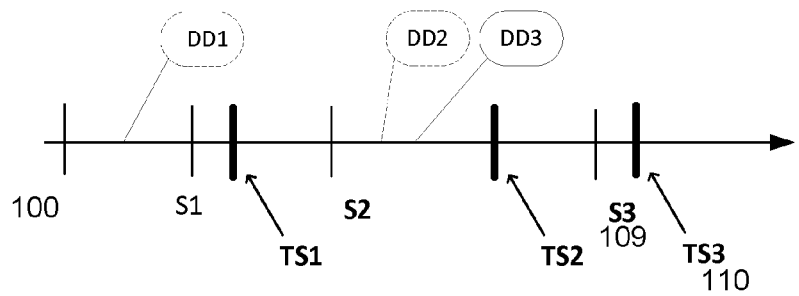
Figure 2J:
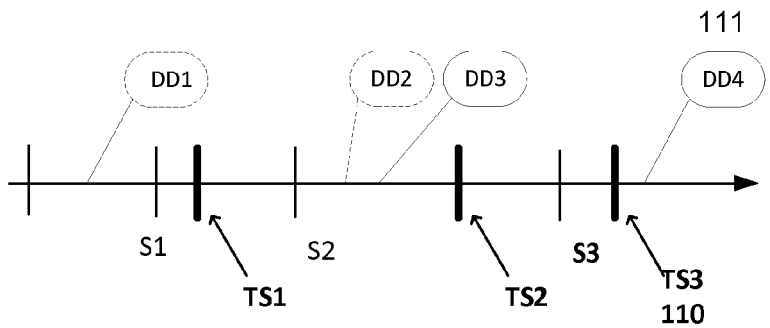
Figure 2K:
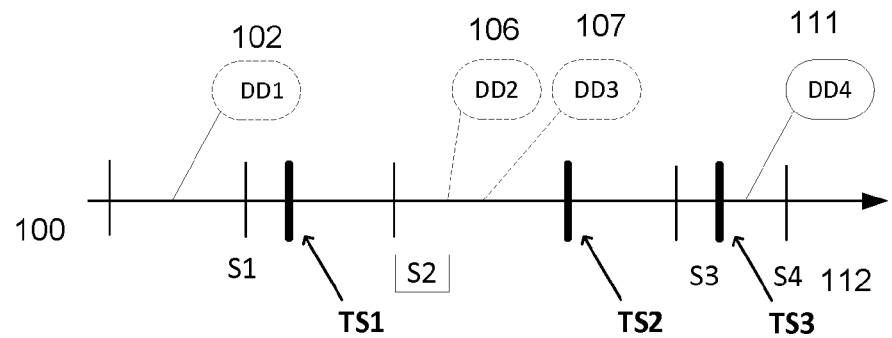
Figure 2K:
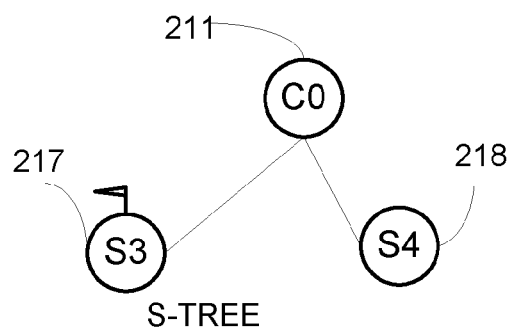

FIG. 2G illustrates a seventh event (denoted 107 in timing diagram 100) and an eighth event (denoted TS2 108 in timing diagram 100). The seventh event 107 includes writing data DD3 to the logical entity C0. The eighth event 108 includes receiving an acknowledgement from the remote site that it (the remote site) successfully received all the information related to S2 and creating a disassociated second snapshot.

The column dedicated to C0 reflects the writing—because the writing occurred after S2 the snap-id field equals S2, the physical address allocated to DD3 is PA3, the data stored is DD3 and the last snapshot existing when event 107 occurred is S2—thus field snap version equals two.

Furthermore—the column dedicated to S2 is changed to reflect the disassociation of S2—fields "physical address" and "data stored" reflect the disassociation by a minus symbol (although any other type of marking can suffice).

FIG. 2G also illustrates the deletion of the column dedicated to S1—as metadata about S1 is not required after TS2.

At this time the s-tree 210 includes root 211 representing C0 and a leaf 215 representing disassociated S2. S1 can be deleted from the s-tree after TS2 and therefore does not appear in s-tree 210.

The ninth event (denoted 109 in timing diagram 100 of FIG. 2H) includes creating third snapshot S3. Because the last writing included the writing of DD3—a column dedicated to S3 is a duplicate of the column dedicated to C0.

Starting from event 109, the data deltas between disassociated snapshot S2 and snapshot S3 can be calculated and transmitted to the remote site. These data deltas include data DD2 and data DD3 (or only DD3 if DD3 was written to the same logical address as DD2 and therefore overwritten DD2). The determination that DD3 was changed between S2 and S3 can be concluded from the mapping metadata that describes the logical address range related to DD3 that indicates that S2 is still associated with the logical address related to DD3 and S3 is associated with physical address (PA3) related to DD3 (as well as being associated with the logical address). Alternatively, it can be determined that DD3 was changed between S2 and S3 because the snap-version (=2, or the last-snapshot field of FIG. 4B) indicates that DD3 was written when snapshot S2 existed.

At this time the s-tree 210 includes root 211 representing C0 and, leaf 215 representing disassociated S2 and leaf 216 representing S3.

The tenth event (denoted TS3 110 in timing diagram 100 of FIG. 2I) includes receiving an acknowledgement from the remote site that it (the remote site) successfully received all the information related to S3 and creating a disassociated third snapshot. Because nothing was written after the writing of DD3 the column dedicated to C0 remains the same. Nevertheless—the column dedicated to S3 is changed to reflect the disassociation—fields "physical address" and "data stored" reflect the disassociation by a minus symbol (although any other type of marking can suffice). Furthermore—the column dedicated to S2 is deleted, as it is no longer needed for data deltas calculation.

The eleventh event (denoted 111 in timing diagram 100 of FIG. 2J) includes writing data DD4 to the logical entity C0. The column dedicated to S3 remains unchanged. The column dedicated to C0 reflects the writing—because the writing occurred after S3 the snap-id field equals S3, the physical address allocated to DD4 is PA4, the data stored is DD4 and the last snapshot existing when event 111 occurred is S3—thus field snap version equals three.

The twelfth event (denoted 112 in timing diagram 100 of FIG. 2K) includes creating fourth snapshot S4. Because the last writing included the writing of DD4—a column dedicated to S4 is a duplicate of the column dedicated to C0.

At this time the s-tree 210 includes root 211 representing C0 and, leaf 217 representing disassociated S3 and 218 representing S4. Starting from event 112, the data deltas between disassociated snapshot S3 and snapshot S4 and be calculated and transmitted to the remote site. These data deltas include data DD4. The determination that DD4 was changed between S3 and S4 can be determined from the mapping metadata that describes the logical address range related to DD4 and indicates that S3 is still associated with the logical address related to DD4 and S4 is associated with physical address (PA4) related to DD4 (as well as being associated with the logical address). Alternatively, it can be determined that DD4 was changed between S3 and S4 because the snap-version (=3, or the last-snapshot field of FIG. 4B) indicates that DD4 was written when snapshot S3 existed.

FIGS. 3A-3I illustrate various events and metadata reflecting the events according to various embodiments of the invention. For simplicity of explanation not all of the data structures are shown in each figure. FIGS. 3A-3I illustrate more data structures than were illustrated in FIGS. 2A-2K and especially make distinction between snapshots' data that is cached and snapshots' data that is destaged. In some examples mapping metadata 200 is shown and in some cached mapping metadata 250 is shown.

The first till third events (denoted 101, 102 and 103 in timing diagram 100 of FIG. 3A) include: (a) the creation of the logical entity C0, (b) writing data DD1 to the logical entity C0, and (c) creating a first snapshot S1. At this stage DD1 is still cached in cache address CA1.

The mapping metadata 200 includes column dedicated to C0—the snap-id field equals C0, the physical address allocated to DD1 is CA1, the data stored is DD1 (this field is added for brevity of explanation alone) and the last snapshot existing (snap version) when event 102 occurred is S0—thus field snap version equals zero.

A column in mapping data structure 200 that is dedicated to S1 is a copy of the column dedicated to C0.

The clone line table 230 indicates that S1 is a first snapshot of C0. Compressed MVE is empty as no data of the snapshot family was destaged.

Figure 3A:
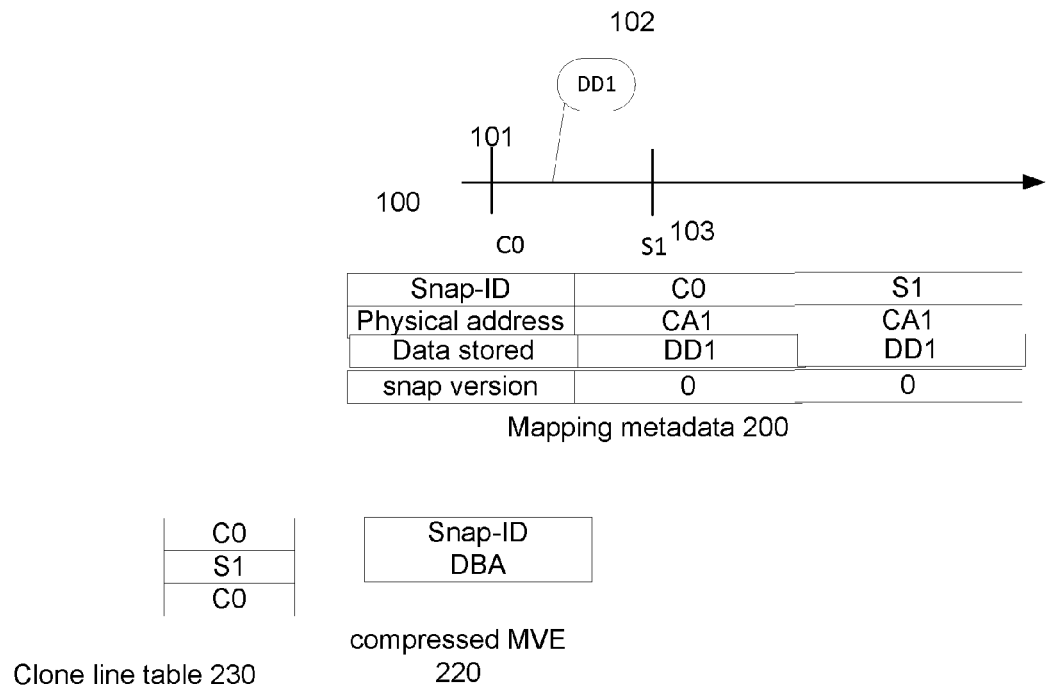
FIGS. 3A-3I illustrate various events and metadata reflecting the events according to various embodiments of the invention.
Figure 3B:
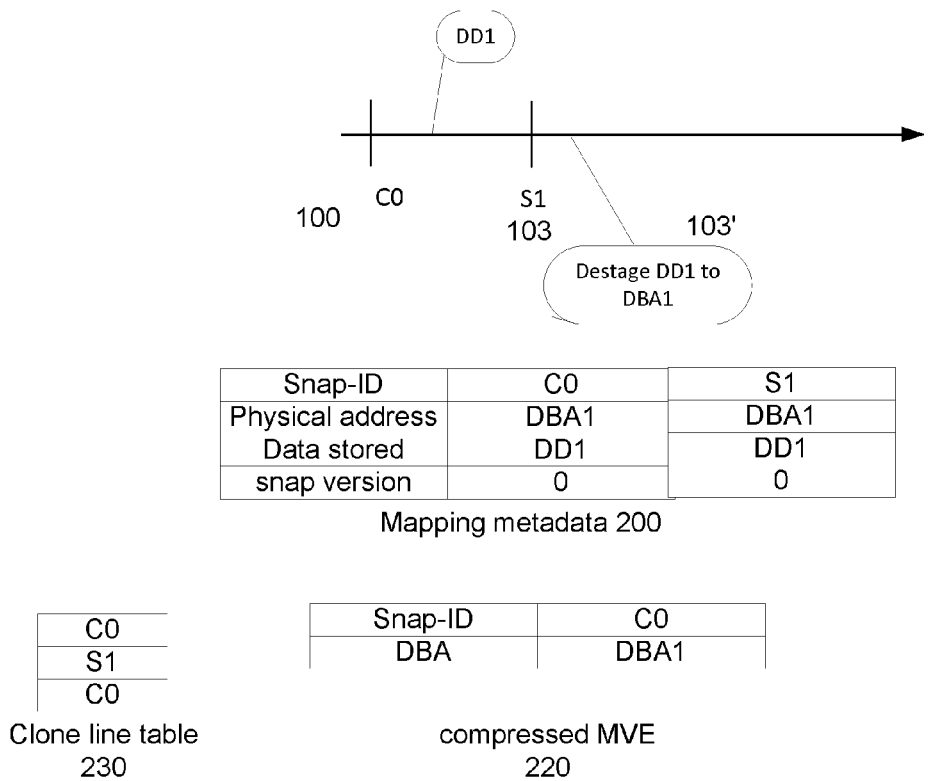

FIG. 3B illustrates a first destaging event 103'-DD1 is destaged to a permanent physical address denoted DBA1. Mapping metadata 200 is updated by replacing CA1 by DB1 in both columns related to C0 and S1. Clone line table 230 remains the same. Compressed MVE 220 includes a single column—dedicated to C0 and indicates that C0 is mapped to DBA1. Because C0 is the origin of S1 and both C0 and S1 are mapped to the same physical address DBA1—only C0 appears in the compressed MVE 220. The clone line table 230 is indicative of the relationship between C0 and S1 and thus the clone line table and the compressed MVE indicate that S1 is also mapped to DBA1.

Figure 3C:
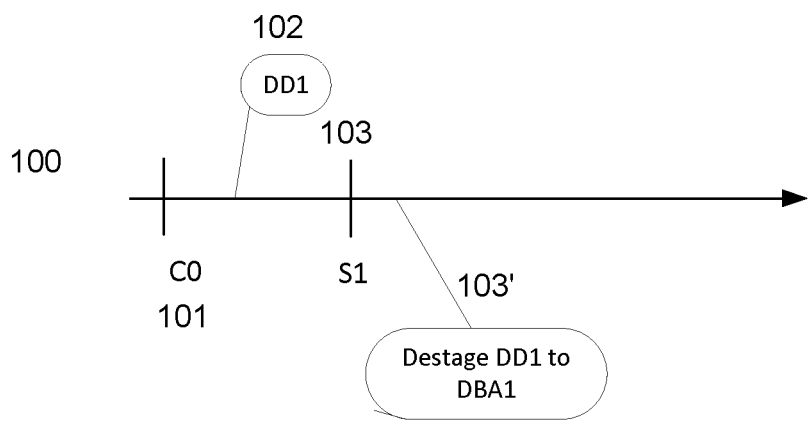
Figure 3D:
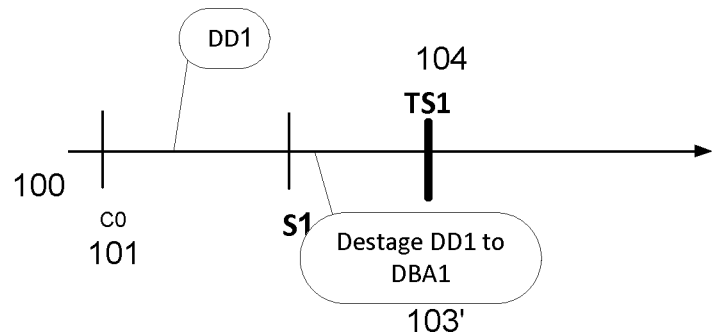

FIG. 3C illustrates an alternative representation of the first destaging event 103' by the mapping metadata 200, in a case where the data DD1 remains in the cache after the destage. The mapping metadata 200 of FIG. 3C shows physical addresses cached data and destaged data. Thus, mapping metadata 200 indicates that the physical address associated with C0 and S1 are both CA1 and DB1. A reference to cached data may be removed once the data is deleted from the cache.

A forth event (denoted 104 in timing diagram 100 of FIG. 3D) includes receiving an acknowledgement from the remote site that it (the remote site) successfully received all the information related to S1 and creating a disassociated first snapshot.

Because nothing was written after the writing of DD1 the column dedicated to C0 remains the same. The disassociation of S1 is reflected in clone line table 230 (S1*), compressed MVE 220 (DBA field equals "-"), the non-compressed MVE 240 (DBA field equals "-") and the cache mapping data structure 250 ("-").

In the compressed MVE a column is added to indicate that S1 is disassociated and does not share the same physical address as C0.

Figure 3E:
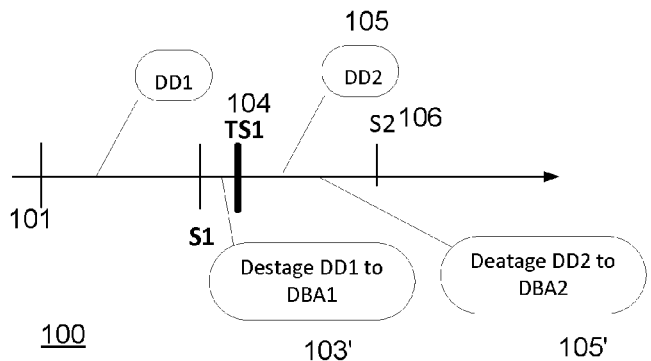
Figure 3F:
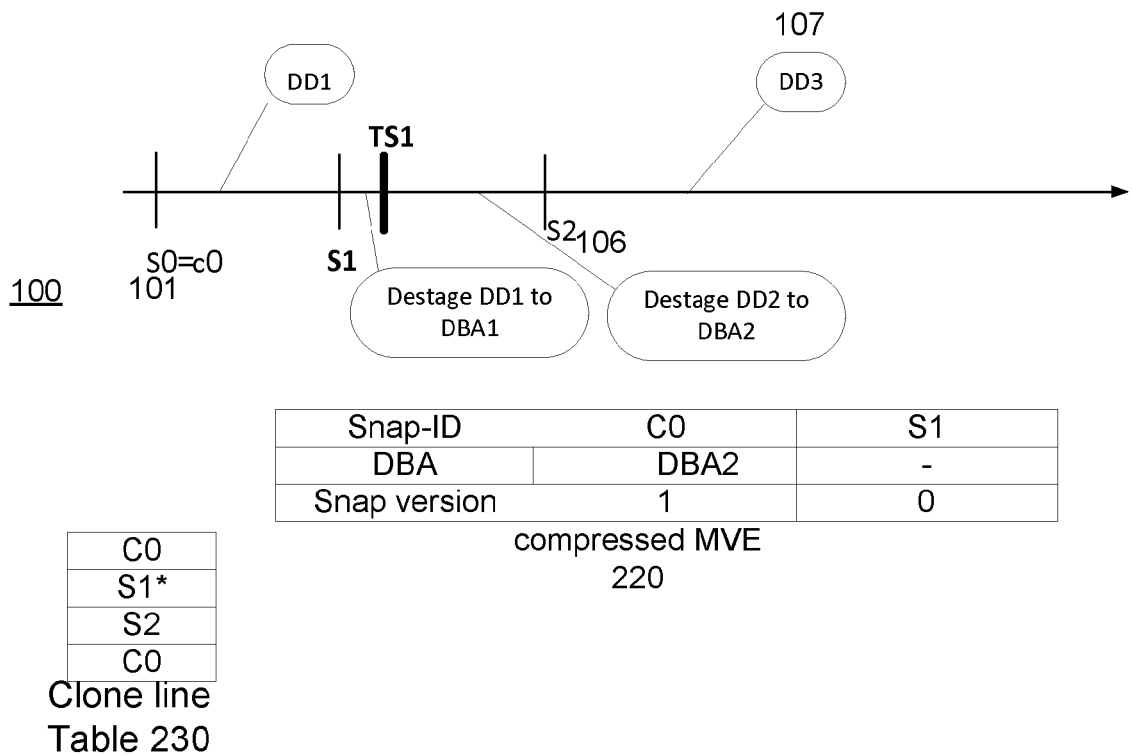

FIG. 3E reflects: (a) a fifth event of writing data DD2 to the logical entity C0 (denoted 105), (b) a second destaging event (denoted 105')—the destaging of DD2 to DBA2, and (c) a sixth event (denoted 106) of creating second snapshot S2.

The column dedicated to C0 in mapping metadata 200 is updated to reflect the writing of DD2 and the destaging of DD2.

The column of S1 remains unchanged and a column dedicated to S2 is a copy of the column associated with C0. The addition of S2 is also reflected in the clone line table 230 (adding an entry after S2) and in non-compressed MVE 240—a column dedicated to S2 indicates that S2 is associated with DBA2.

Seventh event (denoted 107 in timing diagram 100 of FIG. 3F) includes writing data DD3 to the logical entity C0. The cache address that received the data is referred to as CA3. DD3 is not destaged and thus this event is not reflected in compressed MVE 220, or non-compressed MVE 240 (not shown).

Figure 3G:
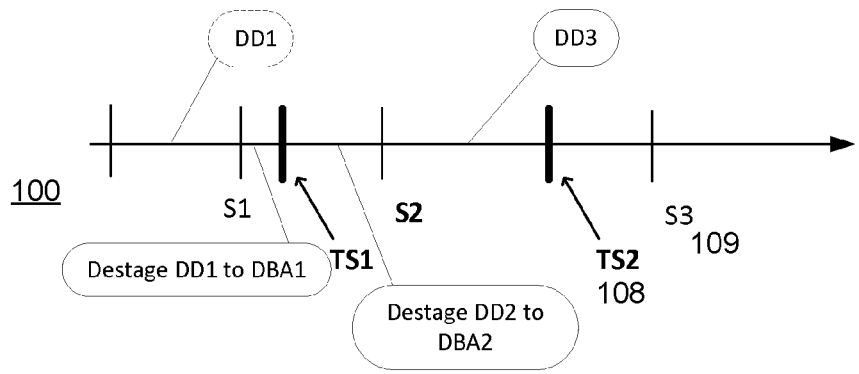
Figure 3G:
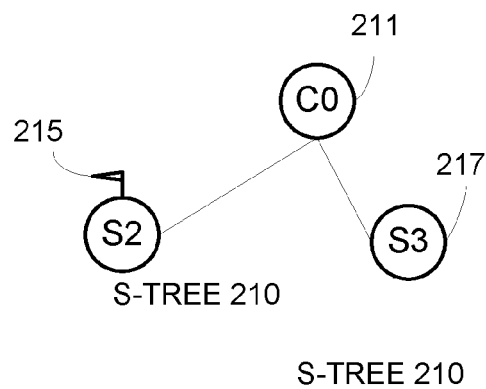

FIG. 3G illustrates an eighth and ninth events (denoted 108 and 109 in timing diagram 100). The eighth event 108 includes receiving an acknowledgement from the remote site that it (the remote site) successfully received all the information related to S2 and creating a disassociated second snapshot. The ninth event includes creating snapshot S3. After the ninth event 109, the data deltas between disassociated snapshot S2 and snapshot S3 can be calculated. The data deltas include DD3. Since this data is still cached, it can be retrieved from the cache in order to transmit it to the remote site as the information related to S3.

Compressed MVE 220 and non-compressed MVE 240 remain unchanged.

The clone line table 230 is updated by deleting the reference to S1, indicating that S2 is a disassociated snapshot (S2*), and adding an entry for S3—after S2*.

The caching mapping metadata 250 was amended to delete any reference to S1 but to include a column dedicated to S3—which is a copy of the column dedicated to C0.

At this time the s-tree 210 includes root 211 representing C0 and, leaf 217 representing S3 and 215 representing disassociated S2.

Figure 3H:
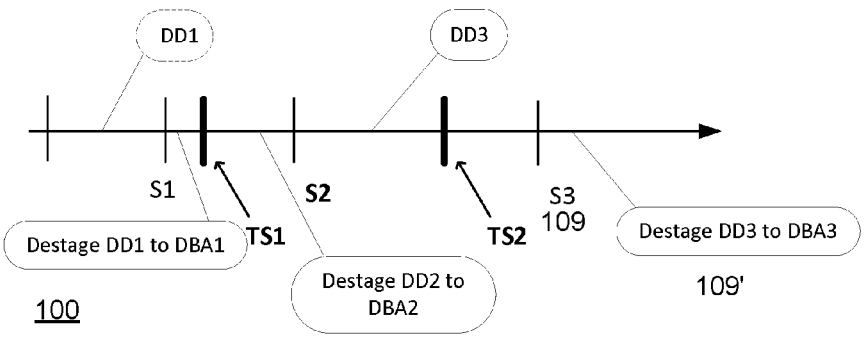

FIG. 3H illustrates a destaging event of DD3 to DBA3. The destaging event is denoted 109' in timing diagram 100.

The clone line table 230 and the cache mapping data structure 250 remain unchanged. The compressed MVE 220 and the non-compressed MVE 240 are updated to reflect that the physical address of C0 is DBA3.

Figure 3I:
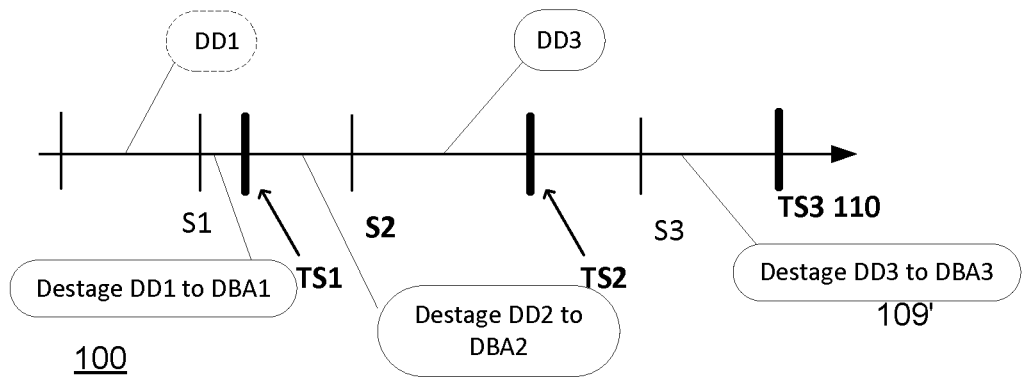

FIG. 3I illustrates a tenth event (denoted 110 in timing diagram 100). The tenth event 110 includes receiving an acknowledgement from the remote site that it (the remote site) successfully received all the information related to S3 and creating a disassociated third snapshot. Information relating to second disassociated snapshot can be deleted.

Compressed MVE 220 remains unchanged.

The clone line table 230 is updated by deleting the reference to S2 and indicating that S3 is a disassociated snapshot (S3*).

It is noted that the different data structures facilitate a very fast and simple creation of snapshots and thus very frequent snapshot can be generated and very frequent mirroring process of snapshots (data deltas) can be performed so that the remote site includes an up to date version of snapshots.

The fast creation of snapshot may be contributed to: (a) creating a snapshot involves updating few data structures (for example s-tree, clone line table) of the creation of the snapshot—without waiting to a destage of data, (b) having a last snapshot field in nodes of the trie can very quickly indicate whether the snapshot family is relevant to a creation of a data delta and if so—where the data delta is located, (c) maintaining metadata about cache and non-cached data simplifies the retrieval of data that is required for creating the data deltas.

Figure 5:
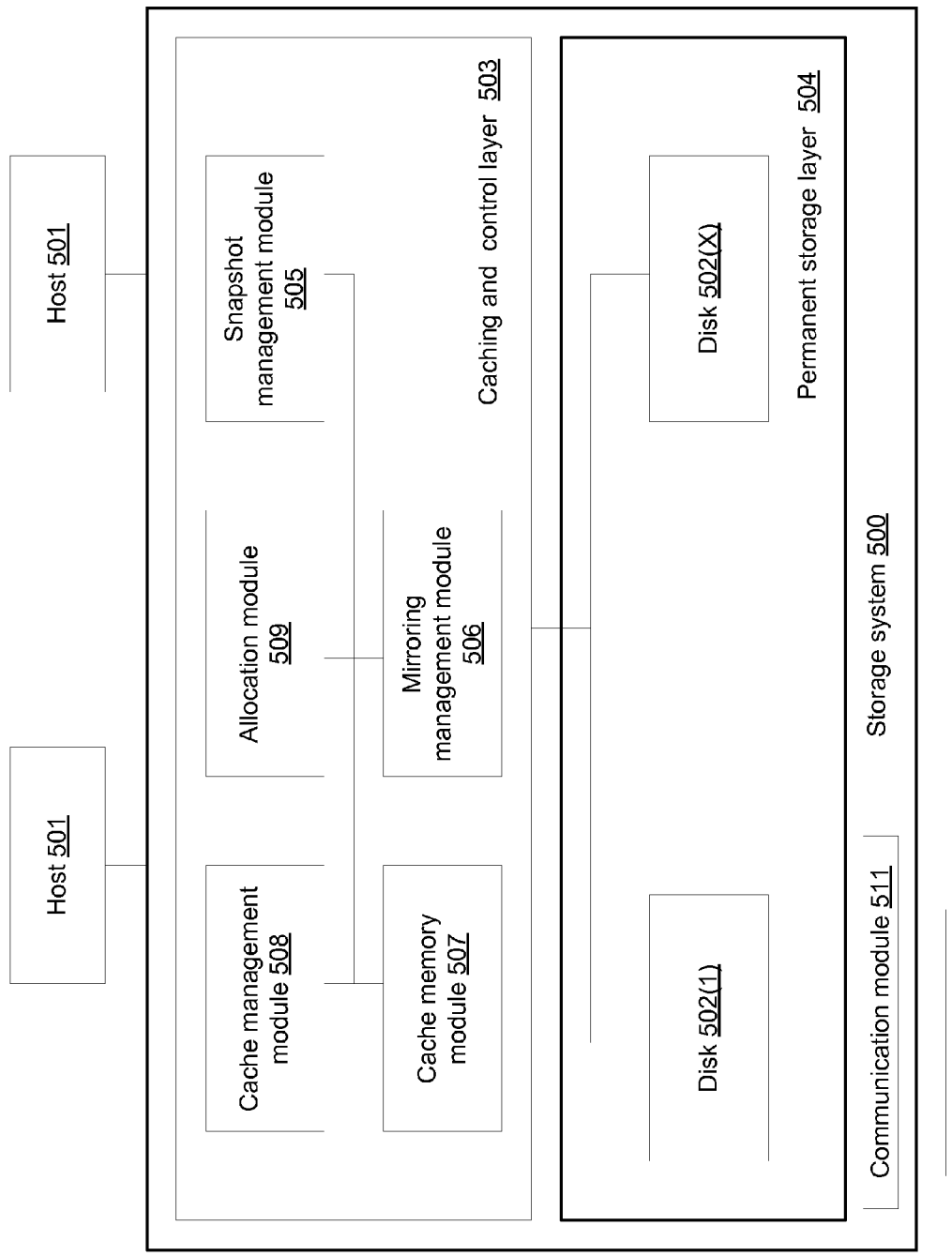
FIG. 5 illustrates a storage system, a remote site and their environment according to an embodiment of the invention.

FIG. 5 illustrates a storage system 500, remote site 600 and their environment according to an embodiment of the invention.

The environment may include various computerized entities such as host computers 501.

Remote site 600 may be similar to storage system 500 but this is not necessarily so. Remote site 600 and host computers may communicate with communication module 511 of storage system 500.

The storage system 500 includes a permanent storage layer 504 and a caching and control layer 503.

The caching and control layer 503 controls the operation of the storage system 500, interfaces with host computers 501, manages most if not all of any of the mentioned above data structures and caches data.

The caching and control layer 503 includes a cache memory module 507, a cache management module 508, a mirroring module 506, an allocation module 509 and a snapshot management module 505.

Any reference in the specification indicating that the storage system may be arranged to perform an operation should be referred to as having one or more of any modules illustrated in the specification as being arranged to perform the operation.

The cache memory module 507 is arranged to cache data that later may be destaged to the permanent storage layer 502 that includes multiple disks 502(1)-502(x).

The cache management module 508 is arranged to manage caching operations, read operations from the cache and deletion of data from the cache.

The allocation module 509 is arranged to manage one or more of the data structures and/or metadata mentioned above. Non-limiting examples include the trie, the s-tree, the clone line table, the compressed or non-compressed MVE and the like.

The mirroring module 506 is arranged to control the mirroring process—trigger the creation of snapshots (by snapshot management module 505), monitor acknowledgments received from a remote site and send indications about the acknowledgements to the allocation module 509 and control re-transmission of data deltas in case of failures.

The snapshot management module 505 is arranged to control the creation of snapshots—and may be triggered to create snapshots for mirroring process purposes or for other purposes. Snapshots may, for example, be requested by other entities—such other processes executed by the storage system, requests originating from users of the host computers, from application of the host computers and the like. The snapshot management module 505 (or any other module mentioned above) may be arranged to create disassociated snapshots.

Each of these modules may include hardware components such as a processor, a computer, a server and the like.

Storage system 500 is capable of executing method 10.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for managing physical resources of a storage system, the method comprises:

transmitting, to a remote site, first information representative of a first snapshot of a logical entity;

wherein the first snapshot is associated with first data that is stored in first physical addresses of the storage system;

wherein the first physical addresses are mapped to first logical addresses;

receiving from the remote site a first acknowledgment indicating that the first information was fully received by the remote site;

disassociating, in response to a reception of the first acknowledgement, the first snapshot from the first physical addresses while maintaining a logical association between the first snapshot and the first logical addresses; and calculating second information representative of a second snapshot that follows the first snapshot, wherein the calculating of the second information is responsive to at least the logical association between the first snapshot and the first logical addresses.

2. The method according to claim 1, comprising performing a physical resource management operation that is responsive to the disassociation of the first physical addresses.

3. The method according to claim 1 comprising:

transmitting to the remote site the second information;

wherein the second snapshot is associated with second data that is stored in second physical addresses of the storage system;

wherein the second physical addresses are mapped to second logical addresses;

receiving from the remote site a second acknowledgment indicating that the second information was fully received by the remote site;

disassociating, in response to a reception of the second acknowledgement, the second snapshot from the second physical addresses while maintaining a logical association between the second snapshot and the second logical addresses; and terminating, in response to the reception of the second acknowledgement, the logical association between the first snapshot and the first logical addresses.

4. The method according to claim 3 comprising deleting, in response to the reception of the second acknowledgement, information about the first snapshot.

5. The method according to claim 1 wherein the calculation of the second information representative of the second snapshot occurs after the disassociating of the first snapshot from the first physical addresses.

6. The method according to claim 1 comprising updating snapshot family metadata to reflect the disassociating of the first physical addresses while maintaining the logical association between the first snapshot and the first logical addresses;
   wherein the snapshot family metadata is indicative of members of a snapshot family and relationships between members of the snapshot family; and
   wherein the snapshot family comprises the logical entity and snapshots of the logical entity.

7. The method according to claim 6 wherein the updating of the snapshot family metadata comprises tagging the first snapshot as being a disassociated snapshot.

8. The method according to claim 1 comprising updating a logical to physical mapping data structure to reflect the disassociating of the first physical addresses while maintaining the logical association between the first snapshot and the first logical addresses;
   wherein the logical to physical mapping data structure is allocated to a snapshot family and is indicative of a mapping between logical addresses and physical addresses;
   wherein the snapshot family comprises the logical entity and snapshots of the logical entity.

9. The method according to claim 8, wherein the logical to physical mapping data structure comprises multiple portions;
   wherein each portion of the logical to physical mapping data structure is dedicated to a logical address range;
   wherein each portion of the logical to physical mapping data structure comprises physical addresses mapped to the logical address range;
   wherein the physical addresses are indicative of physical address ranges allocated to data associated with one or more snapshot family members.

10. The method according to claim 9 wherein the logical to physical mapping data structure explicitly associates up to a single snapshot family member per physical address range;
    wherein when the single snapshot family member and at least one additional snapshot family members are associated with a same physical address range then an association between the at least one additional snapshot family member and the physical address range is expressed by snapshot family metadata that is indicative of members of a snapshot family and relationships between members of the snapshot family; and
    wherein the method comprises updating one of more out of (a) the logical to physical mapping data structure and (b) the snapshot family metadata to reflect the disassociating of the first physical addresses while maintaining the logical association between the first snapshot and the first logical addresses.

11. The method according to claim 8, wherein the updating comprises deleting from the logical to physical mapping data structure any association between the first snapshot and any of the first physical addresses while maintaining indications of the logical association between the first snapshot and the first logical addresses.

12. The method according to claim 1 wherein at least one first physical address of the first physical addresses is associated with a cache memory space and wherein the method comprises updating a cache memory data structure to reflect the disassociating of the first physical storage addresses while maintaining the logical association between the first snapshot and the first logical addresses.

13. The method according to claim 1 wherein at least one first physical address of the first physical addresses is associated with a cache memory space and wherein at least one other first physical address of the first physical addresses is associated with a permanent storage space; wherein the method comprise updating a cache memory metadata and a permanent storage metadata to reflect the disassociating of the first physical storage addresses while maintaining the logical association between the first snapshot and the first logical addresses.

14. The method according to claim 1 comprising:
    receiving a request to generate a requested snapshot;
    determining whether the request to generate the requested snapshot is included in a mirroring process during which snapshots are mirrored to the remote site;
    when it is determined that the request to generate the requested snapshot is not included in the mirroring process then preventing a disassociation of the requested snapshot from physical addresses that store data associated with the requested snapshot while maintaining a logical association between the certain requested snapshot and logical addresses that corresponds to the requested snapshot.

15. The method according to claims 14 comprising preventing the disassociation of the requested snapshot when the request to generate the requested snapshot is originated from a user of the storage system.

16. A non-transitory computer readable medium that stores instructions that once executed cause a computer to perform stages of: transmitting, to a remote site, first information representative of a first snapshot of a logical entity; wherein the first snapshot is associated with first data that is stored in first physical addresses of a storage system; wherein the first physical addresses are mapped to first logical addresses; receiving from the remote site a first acknowledgment indicating that the first information was fully received by the remote site; disassociating, in response to a reception of the first acknowledgement, the first snapshot from the first physical addresses while maintaining a logical association between the first snapshot and the first logical addresses; and calculating second information representative of a second snapshot that follows the first snapshot, wherein the calculating of the second information is responsive to at least the logical association between the first snapshot and the first logical addresses.

17. A storage system that comprises:
    a communication module that is arranged to (a) transmit, to a remote site, first information representative of a first snapshot of a logical entity; wherein the first snapshot is associated with first data that is stored in first physical addresses of the storage system; wherein the first physical addresses are mapped to first logical addresses; and (b) receive from the remote site a first acknowledgment indicating that the first information was fully received by the remote site; and a snapshot management module that is arranged to disassociate, in response to a reception of the first acknowledgement, the first snapshot from the first physical addresses while maintaining a logical association between the first snapshot and the first logical addresses; and to calculate second information representative of a second snapshot that follows the first snapshot, wherein the calculating of the second information is responsive to at least the logical association between the first snapshot and the first logical addresses.

\* \* \* \* \*